US010459430B2

United States Patent
Levine et al.

(10) Patent No.: US 10,459,430 B2
(45) Date of Patent: Oct. 29, 2019

(54) METHOD AND SYSTEM FOR VARIABLE DATA PRINTING IN A 3D PRINT SYSTEM

(71) Applicant: Xerox Corporation, Norwalk, CT (US)

(72) Inventors: Jonathan D. Levine, Rochester, NY (US); David R. Vandervort, Walworth, NY (US); Donald M. Pangrazio, III, LeRoy, NY (US); Robert Eero Nuuja, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 550 days.

(21) Appl. No.: 14/851,038

(22) Filed: Sep. 11, 2015

(65) Prior Publication Data
US 2017/0072639 A1    Mar. 16, 2017

(51) Int. Cl.
| G05B 19/4099 | (2006.01) |
| H04N 1/00 | (2006.01) |
| G06F 3/12 | (2006.01) |
| B29C 64/386 | (2017.01) |
| B33Y 50/02 | (2015.01) |

(52) U.S. Cl.
CPC ........ *G05B 19/4099* (2013.01); *B29C 64/386* (2017.08); *G06F 3/1206* (2013.01); *G06F 3/1243* (2013.01); *G06F 3/1285* (2013.01); *H04N 1/00827* (2013.01); *B33Y 50/02* (2014.12); *G05B 2219/35134* (2013.01); *Y02P 90/265* (2015.11)

(58) Field of Classification Search
CPC . B29C 67/0088; G06F 3/1298; G06F 3/1243; G06F 3/1204; H04N 1/00827; G05B 19/4099; G05B 2219/49007; G05B 2219/35134; B33Y 50/02

USPC .......................................................... 700/98
See application file for complete search history.

(56) References Cited

U.S. PATENT DOCUMENTS

| 2004/0157527 A1* | 8/2004 | Omar ................ G05B 19/4207 446/268 |
| 2005/0182693 A1* | 8/2005 | Alivandi ................. A63F 13/12 705/26.5 |
| 2011/0313878 A1* | 12/2011 | Norman ................. G06Q 30/06 705/26.5 |

(Continued)

FOREIGN PATENT DOCUMENTS

WO    WO-2014076704 A1    5/2014

*Primary Examiner* — Thomas C Lee
*Assistant Examiner* — Gary Collins
(74) *Attorney, Agent, or Firm* — Fox Rothschild LLP

(57) ABSTRACT

A method of producing a variable data design file for use in production of personalized copies of a reference 3D object may include receiving a plurality of fixed structural parameters for a reference object and receiving information for creation of a plurality of variable structural parameters corresponding to variable data regions on the reference 3D object. The method may include using the plurality of fixed structural parameters to develop an instruction set configured to cause a 3D printing device to form a 3D object that exhibits the plurality of fixed structural parameters; and including, in the instruction set, instructions for creating the plurality of variable structural parameters based on the received information that will cause the 3D printing device to render at least one of the plurality of variable data regions in the 3D object, wherein the variable data region differs from a corresponding region of the reference 3D object.

31 Claims, 5 Drawing Sheets

(56) References Cited

U.S. PATENT DOCUMENTS

| | | | | |
|---|---|---|---|---|
| 2013/0080866 A1* | 3/2013 | Ogilvie | ............... | G06F 17/21 |
| | | | | 715/202 |
| 2013/0096708 A1* | 4/2013 | Danks | ............... | B29C 64/386 |
| | | | | 700/98 |
| 2013/0138234 A1* | 5/2013 | Dufort | ............... | G06T 19/00 |
| | | | | 700/98 |
| 2013/0170693 A1* | 7/2013 | Marsh | ............... | G05B 15/02 |
| | | | | 382/100 |
| 2014/0129020 A1* | 5/2014 | Kroner | ............... | H04N 1/00827 |
| | | | | 700/118 |
| 2014/0195921 A1* | 7/2014 | Grosz | ............... | G06F 3/1242 |
| | | | | 715/738 |
| 2015/0055085 A1* | 2/2015 | Fonte | ............... | G06Q 30/0621 |
| | | | | 351/178 |
| 2015/0145158 A1 | 5/2015 | Levine et al. | | |
| 2015/0165692 A1* | 6/2015 | Morrow | ............... | B29C 64/386 |
| | | | | 700/98 |
| 2015/0239270 A1* | 8/2015 | Attia | ............... | B41J 3/4073 |
| | | | | 347/110 |
| 2015/0277155 A1* | 10/2015 | Raviv | ............... | G02C 13/005 |
| | | | | 351/178 |
| 2015/0382123 A1* | 12/2015 | Jobani | ............... | H04R 1/1016 |
| | | | | 700/98 |
| 2016/0059489 A1* | 3/2016 | Wang | ............... | H04L 67/16 |
| | | | | 700/119 |
| 2016/0185043 A1* | 6/2016 | Klappert | ............... | B29C 67/0088 |
| | | | | 264/40.1 |
| 2016/0209819 A1* | 7/2016 | Cudak | ............... | G05B 15/02 |
| 2017/0001376 A1* | 1/2017 | Grimaud | ............... | G06F 3/1208 |
| 2017/0039422 A1 | 2/2017 | Eschbach et al. | | |

\* cited by examiner

METHOD AND SYSTEM FOR VARIABLE DATA PRINTING IN A 3D PRINT SYSTEM

BACKGROUND

In recent years, 3-dimensional ("3D") printing has been demonstrated to be an effective technique for accurately forming 3D objects, such as for the purpose of prototyping and manufacture. A variety of three-dimensional fabrication techniques have been devised to support rapid prototyping from computer models. These techniques have been refined over the years to increase accuracy, working volume, and the variety of build materials available in a rapid prototyping environment. In its most general sense, 3D printing typically utilizes a 3D scanner and/or computer software to generate an image map of a desired object. That image map is then translated into a grid-like structure such that a fabrication device can deposit a flowable material, such as a plastic, polymer, biomaterial or resin, via an additive process, which is simultaneously solidified creating a 3D object.

In 2D printing, variable data printing ("VDP") and related technologies are customized printing technologies that facilitate on-demand customized printing by changing elements such as text, graphics and images from one printed piece to the next, without stopping or slowing down the printing process. VDP may use information from a database or external file to retrieve a record of the variable data, and each database record is applied (often on a 1- to 1-basis) to each new print document. For example, a set of personalized letters, each with the same basic layout, can be printed with a different name and address on each letter, while retaining other common elements, such as images, text, associated drop shadows, or other common elements. In addition to the reduced job submission time, VDP is much faster than printing all of the documents separately because the static part of the job (the part of the document that remains the same for each copy) is only processed once, rather than once per copy. VDP is thus typically used for direct marketing, customer relationship management, advertising, and other printing applications where customization is required. Variable data printing may be similarly desirable in a 3D print system such as, for example, to create multiple copies of the same object with some differences based on user-based customization.

In conventional 2D printing, variable data print files are typically the result of applying a data set to a document template. The data set includes the variable data and/or a set of rules for merging the variable data with the template. To implement some of these features in a more complex 3D print system, a user and/or a provider would not only have to understand the 3D print design files, language, and/or code, but also incorporate many more lines of code that may perform the function of including the variable data in the design file.

The current disclosure addresses the above problem, and discloses systems and methods to incorporate variable data into physical objects printed with 3D printing techniques.

SUMMARY

In an embodiment, a method (and system) of producing a variable data design file for use in production of a personalized copy of a three-dimensional (3D) object is disclosed. In an embodiment, the method may include, by a processing device, receiving a plurality of fixed structural parameters for a reference 3D object and receiving information for creation of a plurality of variable structural parameters corresponding to a plurality of variable data regions on the reference 3D object. The information may include at least one of the following location information of each of the plurality of variable data regions, identification information for each of the plurality of variable data regions, or metadata information for each of the plurality of variable data regions. The method may further include using the plurality of fixed structural parameters to develop an instruction set that is configured to, when executed by a processor of a 3D printing device, cause the 3D printing device to form a 3D object that exhibits the plurality of fixed structural parameters and including, in the instruction set, instructions for creating the plurality of variable structural parameters based on the received information. The instructions for creating the plurality of variable structural parameters, when executed by the processor of the 3D printing device, may cause the 3D printing device to render at least one of the plurality of variable data regions in the 3D object, wherein the at least one variable data region differs from a corresponding region of the reference 3D object. The method may also include saving the instruction set to a variable data design file.

In at least one embodiment, receiving information for creation of a plurality of variable structural parameters corresponding to the plurality of variable data regions on the reference 3D object may include accessing a data source comprising information relating to a plurality of customers; and accessing a rule set to automatically determine the information for the creation of the plurality of variable structural parameters.

In an embodiment, the information for creation of the plurality of variable structural parameters further may also include mapping information for each of the plurality of variable data regions. In some embodiments, the method may also include, by the processing device: receiving variable data for creation of the plurality of variable structural parameters from a data source; linking the variable data to the at least one variable data region; creating the plurality of variable structural parameters using the information for creation of a plurality of variable structural parameters and the variable data; creating a variable data job specification comprising the plurality of variable structural parameters corresponding to the at least one variable data region; and saving the variable data job specification. The mapping information may include at least one of the following: identification of at least one database for retrieving variable data for creation of the plurality of variable structural parameters; a rule set for linking the variable data to the plurality of variable data regions; or a rule set for automatically identifying the at least one database or the rule set for linking the variable data to the plurality of variable data regions.

In at least one embodiment, the method may also include receiving print device capabilities corresponding to the 3D printing device; and formatting the variable data design file to be compatible with the 3D print device based on the received print device capabilities. Additionally and/or optionally, the method may also include formatting each of the variable job specifications to be compatible with the 3D print device; and merging each of the plurality of formatted variable job specifications with the formatted variable data design file to create the 3D print job.

In at least one embodiment, the method may also include creating a 3D print job for creating a plurality of personalized copies of the reference 3D object by: retrieving a plurality of records corresponding to variable job specifications of each of the plurality of personalized copies; and merging each of the plurality of records with the variable data design file. In certain embodiments, the method may include executing the 3D print job by the processor of the 3D printing device and, based on the 3D print job, forming the plurality of personalized copies of the reference 3D object, wherein each personalized copy comprises at least one variable data region that differs from a corresponding region of the reference 3D object. Additionally and/or optionally, the method may also include rendering digital images of each of the plurality of personalized copies of the reference 3D object using the 3D print job; presenting the digital images to a user, via a user interface; and receiving user approval for forming the plurality of personalized copies of the reference 3D object using the 3D printer.

In another aspect of this disclosure, a method (and system) of producing a plurality of personalized copies of a reference three-dimensional (3D) object is disclosed. The method may include receiving a selection of a reference three-dimensional object. The method may also include by a processing device, accessing a reference data file comprising a plurality of fixed structural parameters for producing the reference 3D object; accessing a variable data file comprising instructions for creating a plurality of variable structural parameters for producing a plurality of variable data regions on the reference 3D object; and executing, for each of the plurality of personalized copies of the reference three-dimensional object, the plurality of instructions to create a variable data job specification. The variable data job specification may include a set of variable structural parameters corresponding to a set of variable data regions in a personalized copy. The method may further include by the processing device, creating a 3D print file by merging the variable data job specification for each of the plurality of personalized copies of the reference 3D object with at least one of the following: the reference data file or the variable data file. The method may further include by the processing device, causing a 3D printing device to form the plurality of personalized copies of the reference 3D object using the 3D print file, wherein each personalized copy comprises at least one variable data region that differs from a corresponding region of the reference 3D object.

In some embodiments, executing the plurality of instructions to create the variable data job specification comprises receiving mapping information for each of the plurality of variable data regions; receiving variable data for creation of the set of variable structural parameters from a data source; linking the variable data to the set of variable data regions in the personalized copy; and creating the set of variable structural parameters using the variable data file.

In yet another embodiment, the method may also include receiving print device capabilities corresponding to the 3D printing device; and using the received print device capabilities to format the variable data design file to be compatible with the 3D print device. Alternatively and/or additionally, the method may also include using the received print device capabilities to format each of the variable job specifications to be compatible with the 3D print device; and merging each of the plurality of formatted variable job specifications with the formatted variable data design file to create the 3D print file.

In an embodiment, the method may also include, by the processing device rendering digital images of each of the plurality of personalized copies of the reference 3D object using the 3D print file; presenting the digital images to a user, via a user interface; and receiving user approval for forming the plurality of personalized copies of the reference 3D object using the 3D printer.

In yet another aspect, a system for producing a plurality of personalized copies of a reference three-dimensional (3D) object may include a 3D printing device. The system may also include a computer-readable memory comprising a 3D print file comprising instructions that, when executed by a processor, will cause the 3D printing device to form a plurality of personalized copies of a reference three-dimensional (3D) object by: depositing, for each of the plurality of personalized copies, a plurality of layers of build material, and including, in one or more of the layers, at least one variable data region that differs from a corresponding region of the reference 3D object.

DETAILED DESCRIPTION

Figure 1:
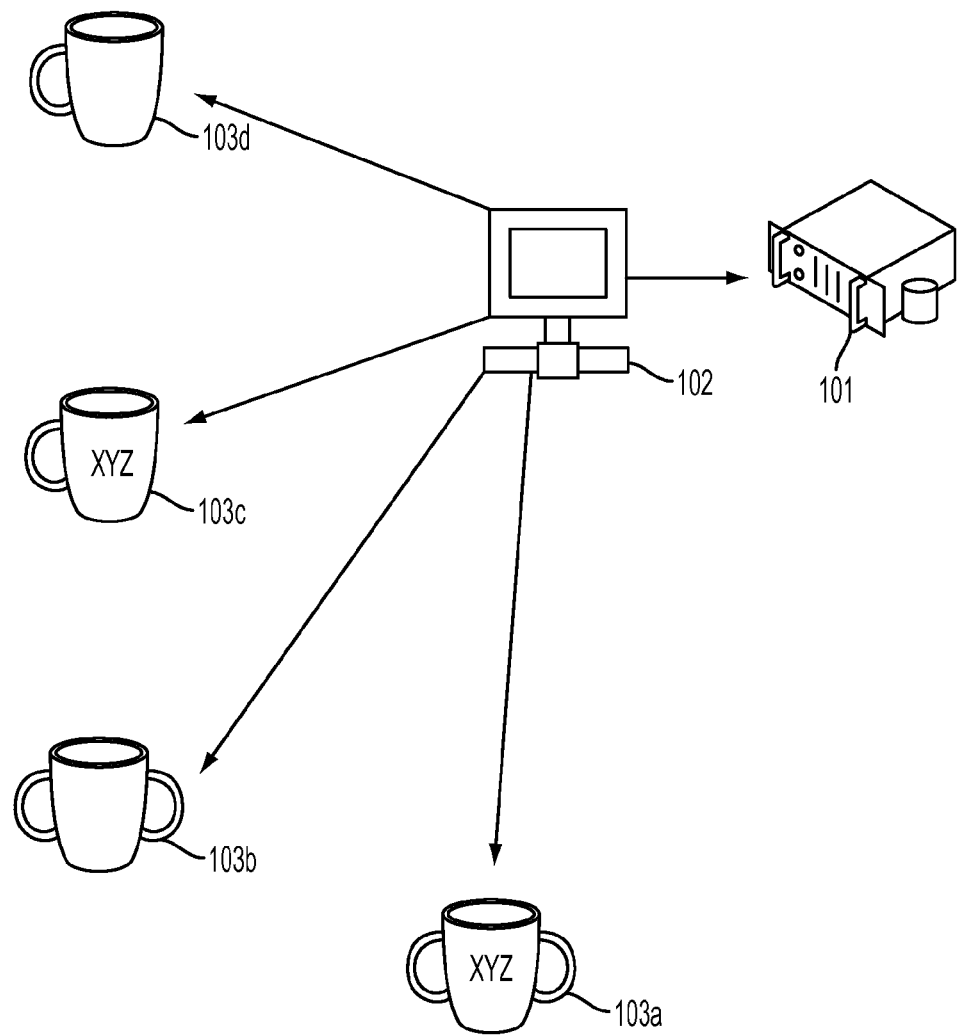
FIG. 1 illustrates a schematic representation of a system for variable data design file of a reference three dimensional object, according to an embodiment.

For purposes of this document, the following terms shall have the following meanings:

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

A "computing device" or "electronic device" refers to a device that includes a processor and non-transitory, computer-readable memory. The memory may contain programming instructions that, when executed by the processor, cause the computing device or electronic device to perform one or more operations according to the programming instructions. As used in this description, a "computing device" or an "electronic device" may be a single device, or any number of devices having one or more processors that communicate with each other and share data and/or instructions. Unless the context specifically dictates otherwise, the term "processor" or "processing device" will include embodiments having a single processor, as well as embodiments in which multiple processors collectively perform various steps of a process. Examples of computing devices and/or electronic devices include personal computers, servers, mainframes, printing devices having a processor and a memory, gaming systems, televisions, and portable electronic devices such as smartphones, personal digital assistants, cameras, tablet computers, laptop computers, media players and the like.

The terms "three dimensional printing" and "3D printing" refer to one of various processes of forming a three-dimensional object from a model or other electronic data source through a process by which multiple layers of a build material are formed and cured, typically under control of a computing device. Examples of 3D printing processes include, without limitation, stereolithography, selective laser sintering, fused deposition modeling, and laminated object manufacturing.

The terms "three dimensional printing device" and "3D print device" refer to a device or system that is capable of performing a 3D printing process. A 3D print device will include a processor. The processor will implement programming instructions, typically using parameters from a data file, that cause an applicator of the device to selectively deposit layers of a build material (such as a photopolymer or powder), and that cause a radiation generating device (such as a laser or heat source) to selectively apply energy to help cure the deposited layers of build material. Examples of this include selective laser sintering (SLS) and fused deposition modeling (FDM) which use melting or softening of material to form the layers. Another example involves curing a liquid material, such as to use digital light processing (DLP) in which a liquid polymer is exposed to light from a DLP projector to form the layers. A further example involves use of inkjet printing techniques to create layers from a powder onto which a binder is printed by the three-dimensional printer. A variety of other examples are also contemplated without deviating from the principles of the current disclosure, to form a substrate of an object. As used throughout this disclosure, the terms "three-dimensional printing system," "three-dimensional printer," "3D print device," "3D printing system," and "3D printer" refer to any now or hereafter known 3D printing system or printer.

The terms "three dimensional scanning device" and "3D scanner" refer to a device or system that is capable of performing scanning data that is embedded in a physical object. A 3D print device will include a processor and one or more sensors that can sense physical attributes of the objects. The sensors may include, for example, an image sensor (camera), sonic sensor (e.g., sonar), materials or chemical properties sensor, a magnetic sensor, an x-ray device, a combination of an infrared camera with an infrared light source, or other sensors. The processor will implement programming instructions, typically using parameters from a data file, that cause the sensor to collect data that is embedded in a 3D object. As used throughout this disclosure, the terms "three-dimensional printing system," "three-dimensional scanner," "3D scanning device," "3D scanning system," and "3D scanner" refer to any now or hereafter known 3D printing system or printer.

"Designing" an object means performing any action or combination of actions which modifies or creates a file comprising data that models or is used to build an object. Designing may be performed on an object which has been previously created as well as for creating a new object from scratch.

The terms "database," "data set," and "data structures" refer to a structured set of data that is accessible by an electronic device, and may be used interchangeably in the current disclosure. The electronic device may search the database and selectively retrieve data that satisfies applicable search parameters.

It should be appreciated that a 3D object (manufactured using a 3D printer) may be any type of 3D physical object imaginable, and that the embodiments disclosed herein should not be understood to apply to only certain types or classes of 3D objects.

"Structural parameters" are data points or rules of design that define the structure of a 3D object. The structural parameters for a 3D object may be included in a data file that a 3D print device may access to construct the 3D object. Examples may include, without limitation, the shape(s), size(s), color(s), geometry(ies), dimensions, surface geometry(ies), interior geometry(ies), build material(s), information relating to text or images to be printed in and/or on the 3D object (size, color, font, etc.), and other such information.

The phrase "fixed data," as used herein, refers to structural parameters and other manufacturing information that remain constant over a plurality of 3D objects in a 3D print project. The phrase "variable data," as used herein, refers to structural parameters and other that may vary between 3D objects in a 3D print project. "Variable data region" as used herein, refers to an area of the 3D object that may include the variable data. The fixed data and variable data information may provide instructions and include details relating to the reference 3D object and/or relating to one or more actions that a 3D printer must perform to create personalized and/or customized copies of the reference 3D object.

Examples of 3D print projects containing both fixed and variable data include 3D projects for personalized trophies, mementos, packages, memorabilia, and the like. A personalized 3D print project includes variable data 3D objects composed of a number of copies, where each copy can be uniquely customized for the intended recipient and/or purpose. The 3D objects may be composed of structural parameters such as shape, color, size, etc. which can be unique to just that copy, identical on every copy, or used on some copies of the object but not on others. Additionally and/or alternatively, the 3D objects may also include text, graphics, and images which can be unique to just that copy, identical on every copy, or used on some copies of the object but not on others. For example, in a customized trophy, unique elements can include text including the recipient's name and address, the shape identifying the bestower, and/or the size indicating the ranking, while the material and color may be identical on every trophy.

FIG. 1 shows a schematic representation of a system embodiment for creating and saving a variable data design file for printing 3D object(s) 103(*a*), 103(*b*), 103(*c*), and 103(*d*) using a computing device 102. The computing device 102 may be in communication with a database 101 having a memory device for storing the created variable data 3D object design file. In some embodiments, the database 101 may be integral with the computing device 102. Alternatively, the database 101 and computing device 102 may be separate devices that share data files by one or more communication networks, or by a physical or manual file transfer process.

As shown in FIG. 1, the variable data regions may include, for example, handles on the coffee mugs (a coffee mug may have one or more, or even no handles), text printed in and/or on the coffee mug, shape of the coffee mugs, and other such variations. It would be understood to those skilled in the art that while the current disclosure uses a coffee mug as an example of the 3D object, principle of the current disclosure may be applied to any object and may include any conceivable variation (now or hereafter known), without deviating from the principles of the disclosure.

In an embodiment, the computing device 102 may also include a computer-aided design (hereinafter "CAD") software capable of designing and modelling objects for 3D printing. Examples of such CAD software include Auto-Cad®, Revit®, or SolidWorks®. Typically, CAD files contain specifications, from which the geometry of an object is generated, which in turn allow for a representation of the object to be generated. Geometry and representation may be stored in a single CAD file or multiple ones. The CAD software module includes graphic tools for representing the modeled objects to the designers. These tools are dedicated to the display of complex objects. A CAD system manages models of objects, which are stored in electronic files. The methods disclosed herein can also be implemented as stand-alone software not dependent on pre-existing CAD software or CAD framework. Such a program may implement its own GUI, and may use standard 3D software libraries for 3D model generation. Alternatively, such a program may implement its own libraries for generating 3D models. The use of CAD software in this disclosure is by way of example, and a person skilled in the art will understand that other software and/or design tools may be used without diverting from the principles of the disclosure.

The computing device may also include one or more variable data modules for enhancing the functionalities of the original CAD software such that it may allow a user to create variable data design files that may be included in a 3D object design file of a CAD design file and/or may be accessed by the CAD software, in accordance with the principles disclosed here. The variable data module(s) may be a software application including functionality to allow a user to create the variable data design file by including for example, locations for including variable data, metadata relating to the variable data, and/or data source and associated rules for the variable data locations. In some embodiments, the variable data module(s) may be stored in a memory device of the computing device 102. Alternatively, the module(s) may be provided on a separate device (such as a memory stick) or as a cloud-based software application that may share data files with the CAD software by one or more communication networks, or by a physical or manual file transfer process.

Figure 2:
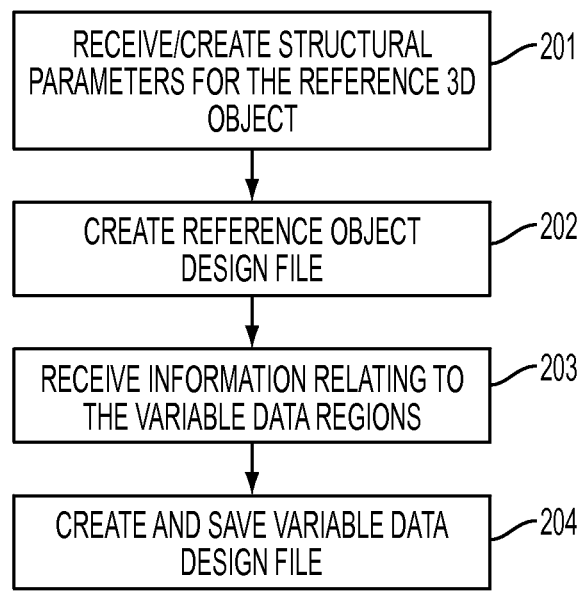
FIG. 2 depicts a flow chart example of a process for creating a variable data design file.

With reference to the flowchart of FIG. 2, a method for designing and creating a variable data 3D object design file is disclosed. In an embodiment, a variable data module functioning as an enhancement module for a known CAD software module may provide instructions to a processor of the computing device to perform the method as described in FIG. 2. Alternatively, the variable data module may perform at least part of the method as described in FIG. 2.

In step 201, the variable data module may receive and/or create the structural parameters for a desired reference 3D object (fixed data) and save it as the reference 3D object design file. In an embodiment, the variable data module may receive the structural parameters for a reference 3D object by retrieving a design file from a database by querying a database for existing design files. Alternatively and/or additionally, the variable data module may receive structural parameters from a user (designer), via a user interface, and use the parameters to create 202 the reference object design file.

In another embodiment, the system may receive the design files via a scanner (using principles now or hereafter known to those skilled in the art) by scanning a reference 3D object to create one or more visualization files, including structural parameters, representing a model of the reference 3D object. Such visualization files may provide data for rendering a two-dimensional ("2D") and/or 3D visualizations of the reference 3D object on a display device communicatively coupled to, or integrated in, the computing device. Visualization file types may include, by way of example, .asm, STL, IGES, STEP, Catia, SolidWorks, ProE, 3D Studio, amf, and/or Rhino files. In some embodiments, the visualization files may include 2D ("flat") digital images, such as a JPEG, GIF, TIFF, BMP, and/or PDF files. The system may transmit the visualization files to the CAD software for modifying and/or generating 3D CAD files representing the reference 3D object. A 3D print device may then use the file(s) to print any number of replicas of the reference object (with customized differences), as described below. In certain embodiments, the CAD file(s) for creating the 3D object may be directly rendered using CAD software and based on any suitable tangible or imaginary object. In certain other embodiments, the system may retrieve the CAD file directly from a stored database of CAD files for objects.

The variable module may receive information relating to creation of the variable data regions (i.e., variable data) in step 203. The information relating to variable data regions may include, without limitation, location information for each variable data region in and/or on the reference 3D object, identification information for the variable data regions, or metadata relating to the variable data regions.

In an embodiment, location information of the variable data in and/or on the 3D object may include defining location coordinates or other such identifying information for regions where a user may include variable data such as, for example, a two dimensional region on the surface of the 3D object, a two dimensional region inside the 3D object, a three dimensional region inside the 3D object, a three dimensional region that is partly inside the 3D object and partly on the surface of the 3D object, and/or a three dimensional region that adds surface area to the 3D object. For example, for a coffee mug, the location information may include location of text or images on the surface of the coffee mug, location of a second handle, location of a variable rim shape, and/or location of a 3D barcode inside the coffee mug. In an embodiment, the whole coffee mug may be a variable data region with respect to color, size, etc. of the coffee mug.

In an embodiment, the variable data module may render a 3D model of the reference object in a graphical user interface giving a designer the capability to spatially define an variable data region locations by, for example, drawing a geometrical shape in the 3D model rendered by the variable data module. Alternatively and/or additionally, the variable data module may prompt the designer to select locations from a selection of variable data regions possible on the reference 3D object.

In an embodiment, the identification information relating to the variable data regions may include information to uniquely identify each of the variable data regions on the 3D object. For example, the identification information may include unique names, labels, tags, or any other similar ID.

In an embodiment, metadata relating to the variable data regions may include information describing each of the variable data regions. Examples of metadata may include, without limitation, structural parameters for the variable data regions such as color(s), build material(s), shape(s); print resolution; font size; font color; font style; type of variable data (two dimensional and/or three dimensional); density; and other such information.

In certain embodiments, the information relating to variable data regions may also include mapping information of the variable data regions to one or more data sources. Mapping information for each variable data region may include, without limitation, identification of one or more data sources from which variable data may be extracted for each of the variable data regions, rules for extracting variable data from the one for more data sources, a rule set for linking the information to the variable data regions (discussed in detail below), and/or criteria for automatically identifying the mapping information.

In an embodiment, a designer may provide some or all of the information relating to creation of the variable data regions through a user interface.

In certain other embodiments, the variable data module may identify some or all of the information relating to creation of the variable data regions automatically by accessing a rule set. In an embodiment, the rule set may include rules for identifying the location of variable data regions based on, without limitation, the structural parameters of the reference 3D object and/or metadata relating to the variable data regions provided by a user. In alternative examples, the designer may provide commands/rules that the variable data module may use in conjunction with other parameters such as size, shape of variable data regions (and/or reference object), geometry constraints, print device capabilities, etc., to automatically derive the location information. For example, a rule set may require that structural strength of the 3D object and/or variable data regions always be above a threshold value. In another example, the module may determine that the variable data region must be on the surface of the 3D object based on its size, shape and two dimensional nature (provided by a user). In yet another example, the module may automatically determine the location of a second handle of a coffee mug based on a rule specifying that second handle must be positioned diametrically opposite the first handle in a coffee mug and/or based on the size constraints of the coffee mug.

In another embodiment, the rule set may include rules for identifying the metadata based on, without limitation, structural parameters of the reference 3D object, print device capabilities, and/or location of the variable data region specified by a designer. For example, the module may automatically determine the color and the material of a handle of a second handle for a coffee mug based on the structural integrity of the handle, print device capability, and/or aesthetics.

In an embodiment, the rule set may include rules for automatically assigning identifying information the variable data regions. For example, in an embodiment, geometrical coordinates may be used to identify location information, names (such as color, shape, etc.) may be used to identify metadata, and/or indexed descriptors may be used to describe mapping information.

In step 203, the variable data module may organize and save the information relating to variable data regions in a data structure to create a variable data design file. In an embodiment, the module may first generate a data representation and/or schema from the received information by defining a set of rules for encoding information in a format that is readable by a target 3D print device. A schema may define how the information is modelled into the data, and how the data is organized in a database. Any known methods and applications (such as XML) may be used to create the data and/or the schema. In some embodiment, the schema of a database may be defined by a user or may be suggested by the CAD software. Once a database schema is defined, the variable data module may then organize and label the received information, in accordance with the schema, by tagging with appropriate metadata tags to identify the information and associate the resources.

In an embodiment, the schema for the variable data design file may include rules for creating the variable data design file in a data structure separate and distinct from the design file of the reference 3D object. In an embodiment, the separate and distinct variable data design file may be stored as a part of the CAD software itself. Alternatively and/or additionally, the variable data design file may be stored as a data structure stored by an external service that may be accessed by a CAD software. These files may be inter-referenced (e.g., using tags included in one or both of the files)

In another embodiment, the schema for the variable data design file may include rules for creating the variable data design file as part of the reference 3D object design file itself. In an embodiment, the variable data module may include the information relating to variable data regions in the reference 3D object design file, in the CAD software's native file format (or formats) such as STL, .asm, IGES, STEP, Catia, SolidWorks, ProE, 3D Studio, and/or Rhino files. In an embodiment, the variable data module may process the information relating to the variable data regions into a desired format, if necessary.

It will be understood that the above file structures and/or schemas are merely illustrative and that there are a variety of file structures that are suitable for storing variable data information.

The above variable data design file may be created by a manufacturer (or designer) of the reference 3D object, who may then grant a license to customers for using the variable data design file to create personalized copies of the reference 3D object.

Figure 3:
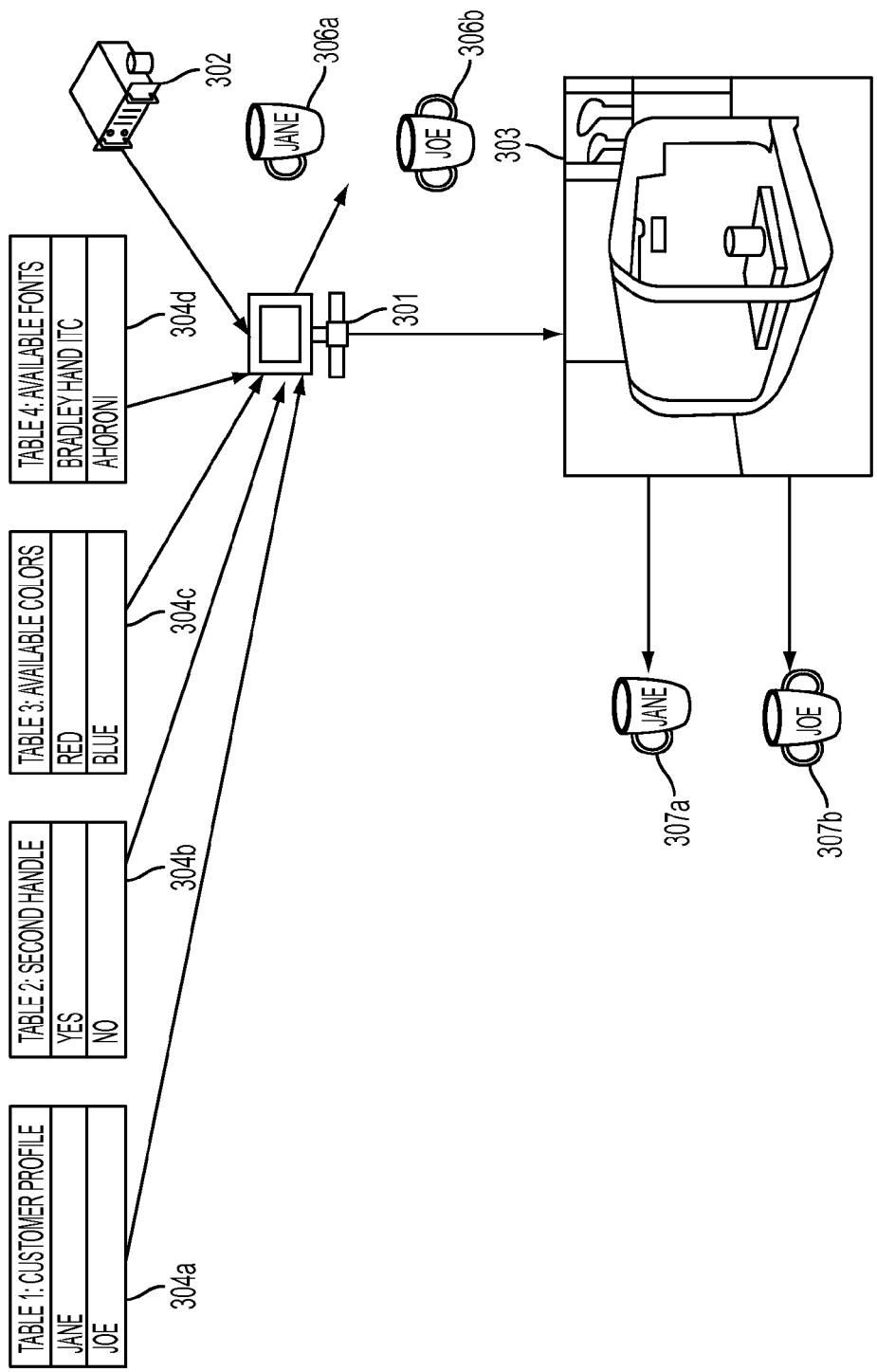
FIG. 3 depicts a schematic representation of a system for creating personalized copies of a reference three dimensional object, according to an embodiment.

FIG. 3 shows a schematic representation of an example system embodiment for creating personalized copies (physical copies 307(*a*) and 307(*b*), and digital copies 306(*a*) and 306(*b*)) of a reference 3D object using a variable data design file for the reference 3D object. The system may include a 3D print driver 301 in communication with a database 302 and a 3D printer 303. The 3D print driver may also be in communication with various data sources 304(*a*), 304(*b*), 304(*c*), and 304(*d*). Although the 3D print driver 301 is illustrated as a desktop computer, the 3D print driver 301 may be configured in a variety of ways, such as through a plurality of servers, distributed "via the cloud," handheld computing devices, and so on. Although illustrated separately the 3D printer 303 may incorporate the functionality described for the 3D print driver 301, e.g., to function as a stand-alone device. Additionally and/or optionally, the 3D print driver may execute on any now or hereafter known computing device and/or may be part of a cloud based server. Furthermore, in an embodiment, the 3D print driver may execute the functionality of the variable data module of FIGS. 1 and 2. Further, the 3D print driver 301 may also include CAD software capable of designing and modelling objects for 3D printing (as discussed above). The methods disclosed herein can also be implemented as stand-alone software not dependent on pre-existing CAD software or CAD framework. Such a program may implement its own GUI, and may use standard 3D software libraries for 3D model generation. Alternatively, such a program may implement its own libraries for generating 3D models. The use of CAD software in this disclosure is by way of example, and a person skilled in the art will understand that other software and/or design tools may be used without diverting from the principles of the disclosure.

The 3D print driver 301 may also be configured to output a user interface, which may be used to support a variety of different user interactions. For example, a user may specify criteria to be used to form the object by the 3D printer 303, which may include a size, shape, and/or color of the object. In another example, a user may select from a variety of predefined objects, which may be customizable by the user, such as to a particular size, shape or color.

The print driver may also include one or more print modules for enhancing the functionalities of the original CAD software such that it may allow a user to create personalized copies of the reference 3D object, in accordance with the principles disclosed here. The print module(s) may be a software application including functionality to allow a user to create the variable data design file by including for example, locations for including variable data, metadata relating to the variable data, and/or data source and associated rules for the variable data locations.

Figure 4:
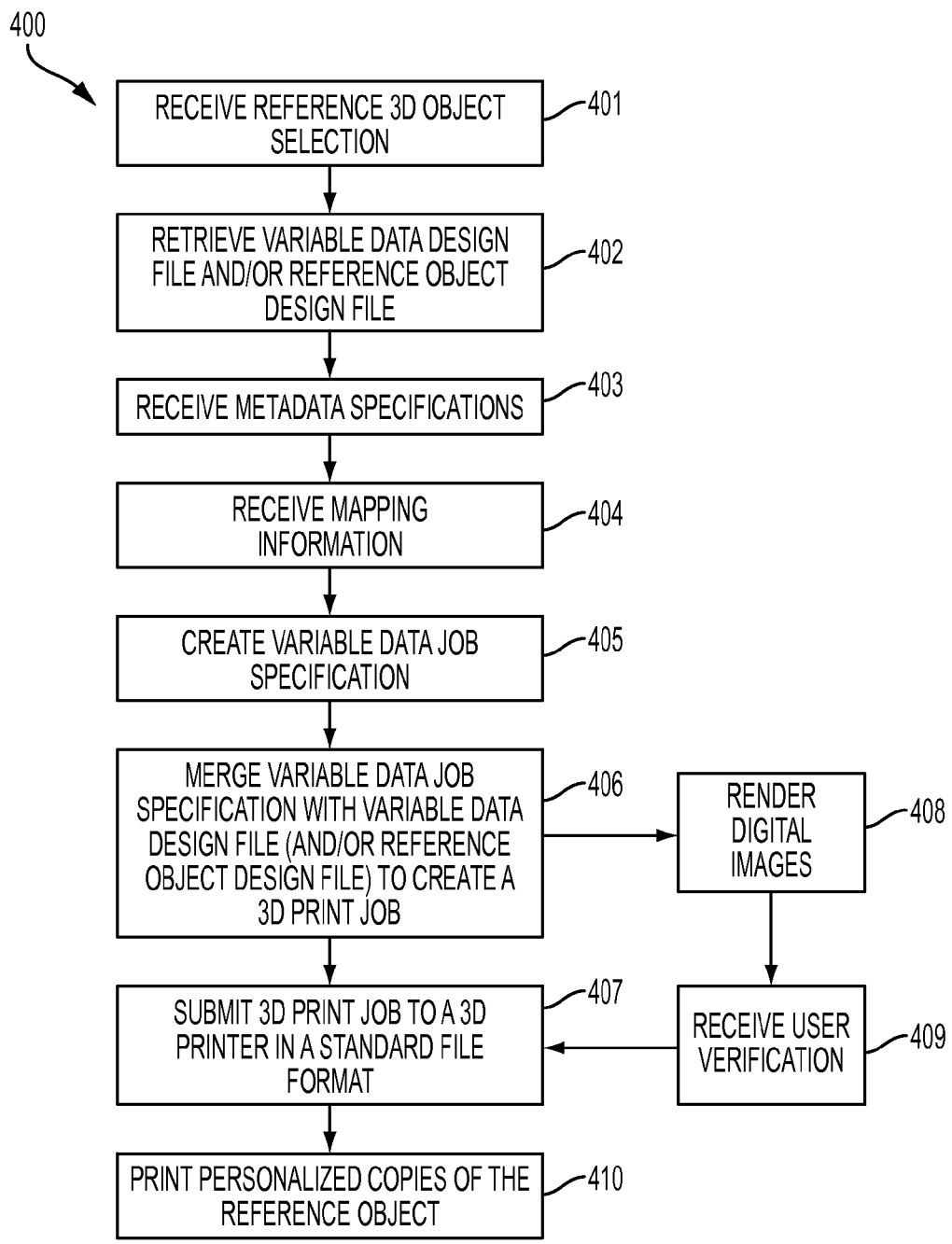
FIG. 4 depicts a flow chart example of a process for creating personalized copies of a reference three dimensional object, according to an embodiment.

With reference to the flowchart of FIG. 4, a method for creating personalized copies of a reference 3D object is disclosed.

The user (customer) may create personalized copies of a reference 3D object using a print driver. In step 401 the print driver may receive the selection of a reference 3D object from the user via a user interface. The print driver may then retrieve 402 a previously saved variable data design file for the reference 3D object. If the variable data design file is separate from the reference 3D object design file, the print driver may also retrieve the reference 3D object design file.

In step 403, the print driver may extract and/or receive metadata specifications relating to the variable data regions. In an embodiment, some or all of the metadata specifications may be included in the variable data design file (as discussed above). In another embodiment, a user may provide some or all of the metadata specifications to the print driver if the metadata information is not included in the variable data design file and/or if the variable data design file provides a rule set for allowing the user-provided metadata specifications to override the metadata specifications included in the variable data design file.

In step 404, the print driver may extract and/or receive mapping information relating to the variable data regions. In an embodiment, some or all of the mapping information may be included in the variable data design file (as discussed above). In another embodiment, a user may provide some or all of the mapping information to the print driver if the mapping information is not included in the variable data design file and/or if the variable data design file provides a rule set for allowing the user-provided mapping information to override the mapping information included in the variable data design file. For example, mapping information may include the database(s) identification and the rules for mapping the information for the variable data regions.

In an example embodiment, for creating personalized copies of a coffee mug, the mapping information may include database(s) identifications for customer profiles and related coffee mug preferences. For example, a coffee mug may include variable data regions A (text region) and B (second handle region). The mapping information may include information identifying the appropriate database(s) for retrieving the color, shape, and/or presence of the second handle as well as a rule set for linking the database entries with a customer/user profile. The mapping information may also include database(s) identity for retrieving the color, text, font, size, etc. for the text region as well as a rule set for linking the database entries with a customer/user profile. As discussed above, some or all of the above information may be provided by the user and/or may be extracted from the variable region design file. For example, the variable region design file may provide/define that the text color database may include blue, red, green, etc. colors, and the user may provide mapping rules from the color database for the customer profiles such that customer A may have a red handle, customer B may have a blue handle, and so on. In another example, the print driver may automatically chose the colors from the color database by accessing a database for customer profiles, where each customer's profile may include favorite colors or information for predicting a favorite color such as past user actions and history. Similarly, text may be provided by a user and/or may be automatically determined by the print driver. For example, based on a customer profile database, the print driver may automatically use the name of the customers to populate the text field. The above examples are provided only for description purposes and are not limiting.

In step 405, the print module may use the mapping information, the metadata specification, the variable data design file, and/or the reference 3D object design file to create a variable data job specification. In an embodiment, the print module may create the variable data job specification by using the mapping information to retrieve and link variable data information for each of the variable data regions. The variable data job specification may include rules and parameters that define the variable data regions and the corresponding variable data for each personalized copy of the reference 3D object. The 3D print driver may map each variable data region defined in the variable data design file to an appropriate field in the variable data job specification. An example variable data job specification for creating two personalized copies of a reference coffee mug (discussed above—a coffee mug including variable data regions A (text region) and B (second handle region)), is shown below.

| 3D Print Job Specification | Job # | First Name | Extra Handle | Font Color | Font |
|---|---|---|---|---|---|
| Copy 1 | 454 | Jane | No | Red | Bradley Hand ITC |
| Copy 2 | 454 | Joe | Yes | Blue | Ahoroni |

As shown in the above table, the variable data regions (a text region and a second handle) on a coffee mug are linked to the respective variable data information, by linking to the appropriate information sources (as discussed above), such that the text region on copy 1 will include "Jane" in red color and Bradley Hand ITC format with no second handle, and copy 2 will include "Joe" in blue color and Ahoroni format with an included second handle. The variable data specification may also include a Job ID number, which is same for printing both personalized copies of the reference coffee mug because the copies are printed in a single print job.

The above variable data job specification may also be created in JSON format as follows:

```
Copy 1:
    {
    "segment": "56e37c8dad3e7",
    "type": "text",
    "content": "Jane"
    "properties": "Font: Bradley Hand ITC; 12pt Bold; Color: #REd;"
    }
Copy 2:
    {
    "segment": "23e26bc1e358",
    "type": "text",
    "content": "Joe"
    "properties": "Font: Ahoroni; 12pt Bold; Color: #Blue;"}
    {
    "segment": "b7186804f9fd5662",
    "type": "add-on",
    "content": "handle: 359324859b4a2ba53fc17e7d16b ",
    }
```

Another example of the variable data job specification (in JSON) for a personalized copy of a coffee mug is presented below:

```
{
  "segment": "56e37c8dad3e7",
  "type": "text",
  "content": "Sgt. Pepper First Place Broken Alleys 2015 Bowlathon."
  "properties": "Font: Times New Roman 12pt Bold; Color: #FFF;"
}
{
  "segment": "23e26bc1e358",
  "type": "custom shape",
  "content": "shape:359324859b4a2ba53fc17e7d16b"
}
{
  "segment": "b7186804f9fd5662",
  "type": "add-on",
  "design": "Joe's coffee mug lid 317a",
  "size": "extra-large",
  "URI":"https://joesdesigns.com/cad/1/17eeb-d49b432e7-eed738-31e3867?key=cad1b9ffd165c359bffe903e86ca2c786"
}
```

The above variable data job specification incorporates the following variable data in a personalized copy of a coffee mug:
It changes the shape of the handle, i.e., variable data region at location "23e26bcle358" for one with a fish shape,
It adds text in variable data region at location "56e37c8dad3e7" such that the coffee mug may be used as a bowling trophy ("Sgt. Pepper First Place Broken Alleys 2015 Bowlathon"), and
It attaches an optional lid component in variable data region at location "b7186804f9fd5662" which was designed by an outside vendor and provides a URL for the outside vendor's design The above variable data job specifications and formats are provided only as examples and other formats, languages, and/or styles are within the scope of this disclosure.

In an embodiment, the print driver may present the variable data specifications for each personalized copy in a user-readable format to a user, via a user interface, for verification.

The above discussed variable data specifications may be individually created for each of the personalized copies of the reference 3D object. Each of the above variable data specifications for each personalized copy may be stored as an individual record in a variable data source/database, such that each individual record may specify all of the variable data (and associated information) to be included in the respective personalized copy of the reference 3D object.

Pursuant to step 406, the print module may create a 3D print job by automatically merge the variable data specification record for each personalized copy with the variable data design file to create a corresponding 3D print job for each personalized copy of the reference 3D object. In an embodiment, if the variable data design file is in a data structure separate and distinct from the design file of the reference 3D object (as discussed above), the print module may also use the reference 3D object design file to create the print job.

In an embodiment, the print driver may receive print device capabilities (from the 3D print device and/or a database) for the destination 3D printer, and may output each new variable data specification, for each personalized copy, in the original file format as that of the reference object design file only if the destination 3D printer can receive and process the original format. In another embodiment, the print driver may process and convert the variable data specification from the original file format to a hardware-specific file format supported by the destination 3D printer. In an embodiment, the print driver may convert the design file (variable and/or reference) to the hardware-specific file format supported by the destination 3D printer only once before the above merging step, and only process the variable data specification of the object for each personalized copy, in order to conserve time and processing resources. Hence, only parts of the personalized copy that include the variable data regions will need to be reprocessed for each variation. In yet another embodiment, the complete print job (including both the design file and the variable data job specification) may be converted to the 3D printer supported format every time a personalized copy file is sent to the 3D printer for printing. In some embodiments, the print driver may not format the print job at all even if it is not supported by the 3D printer and the 3D printer instead may include the capabilities and/or processors for formatting the print job.

For example, in an embodiment, the 3D printer may only support a print job in "stl format.' The print driver may thus format the print job to an stl format before transmission to the 3D printer. In an embodiment, the 3D printer may format the entire print job to an stl format every time a personalized copy file is sent to the 3D printer for printing. In another embodiment, the print driver may convert the design file (variable and/or reference) to the stl file format only once before the above merging step, and only process the variable data specification of the object for each personalized copy, in order to conserve time and processing resources.

In an embodiment, if the print job is submitted to a group of print devices, the print driver may process and convert the variable data specification from the original file format to a hardware-specific file format only when the destination print device is known or predicted based on print queue status (discussed below), based on print device prediction methods now or hereafter known to those skilled in the art. In an embodiment, the print driver may convert the design file (variable and/or reference) to the hardware-specific file format(s) supported by all or majority of the destination 3D printers in the 3D print queue only once before the above merging step, and only process the variable data specification of the object for each personalized copy when the destination 3D printer is known or predicted, in order to conserve time and processing resources.

In an embodiment, the print driver may also take into consideration other print device capabilities such as, for example, size, color, shape, or geometry constraints of the 3D object that a destination 3D printer can print to create the print job. In an embodiment, the print driver may create the variable data job specification based on the print device capabilities and/or edit the variable data design file (and/or reference design file) such that a destination printer is capable of printing the personalized copy of the reference 3D object. For example, if the destination printer(s) can only print a 3D object of height below 12 inches, the print driver may automatically adjust the height of the personalized copies of the reference 3D object to less than or equal to 12 inches irrespective of the height of the reference 3D object in the reference design file. In an embodiment, the print driver may prompt a user to approve the above described modifications. In another example, if a personalized copy of the reference 3D object requires an outer surface to be printed in color A which the destination 3D printer cannot print, the print driver may, for example, present an error message or a list of substitute colors to the user, and/or automatically substitute to a color that the 3D printer is capable of printing. It should be noted that the above example are provided only for description purposes and are not limiting.

The print driver may then submit 407 the newly specified (or personalized) version of the original design file containing the object specification and its variable data specification to a queue which feeds one or more 3D printers (or directly to a 3D printer). It should be noted that each new personalized copy of the reference object created in this way is separate and independent from all of the other copies created during the same process. However, each copy's specification and file format are the same as if a designer had used a 3D CAD software (or other design software) to create each copy manually.

For example, in an embodiment, for the first personalized copy of the reference 3D object, the print driver may automatically merge the variable data specification from the first record in the data source into the reference object's design file (variable and/or reference) to create a 3D print job. The print driver may then send the 3D print job for the first copy to a 3D printer and/or print queue. For the second personalized copy of the reference object, the print driver may merge the variable data specification from the second record in the into the data source into the reference object's design file (variable and/or reference), included in the 3D print job and may submit the newly specified version of the original file containing the object and its variable data to the print queue (and/or a specified printer). The steps are repeated until all of the records in the data source have been included in the 3D print job.

In an embodiment, the user may also specify a 3D printer or a 3D printer queues/printer groups for printing the personalized copies. The personalized copies of the reference 3D object may all be printed at the same printer or may be printed at different printers as and when a 3D printer may become available in a 3D print queue. The print jobs are (normally) printed in order of their job submission time, i.e., the earliest in time is printed first, using principles known to those skilled in the art. In an embodiment, the print driver may also display a print queue status to the user, via a user interface. A 3D print queue status may be similar to any now or hereinafter known 2D print queue statuses, and may provide job controls such as to delete a job before it is printed, to select a 3D printer in the queue, or to hold a job so before it is printed. In an embodiment, each queue may have one or more 3D printers associated with it. In another embodiment, multiple queues with different configurations or job sources may feed a single 3D printer. The 3D print queue may be part of the print driver, may run on the same computing device as the print driver, and/or may run on a remote networked computing device.

In an embodiment, the print driver may render 408 digital images of the personalized copies using the 3D print job, and receive (409) user verification before submission of the print job to the 3D printer.

Finally, in step 410, the 3D printer may print at least one copy of each personalized copy of the reference 3D object, in accordance with the print job including the variable data specification. The 3D printer may use any now or hereafter known 3D printing process, such as where the printer builds an object over a substrate using multiple layers of build material.

Figure 5:
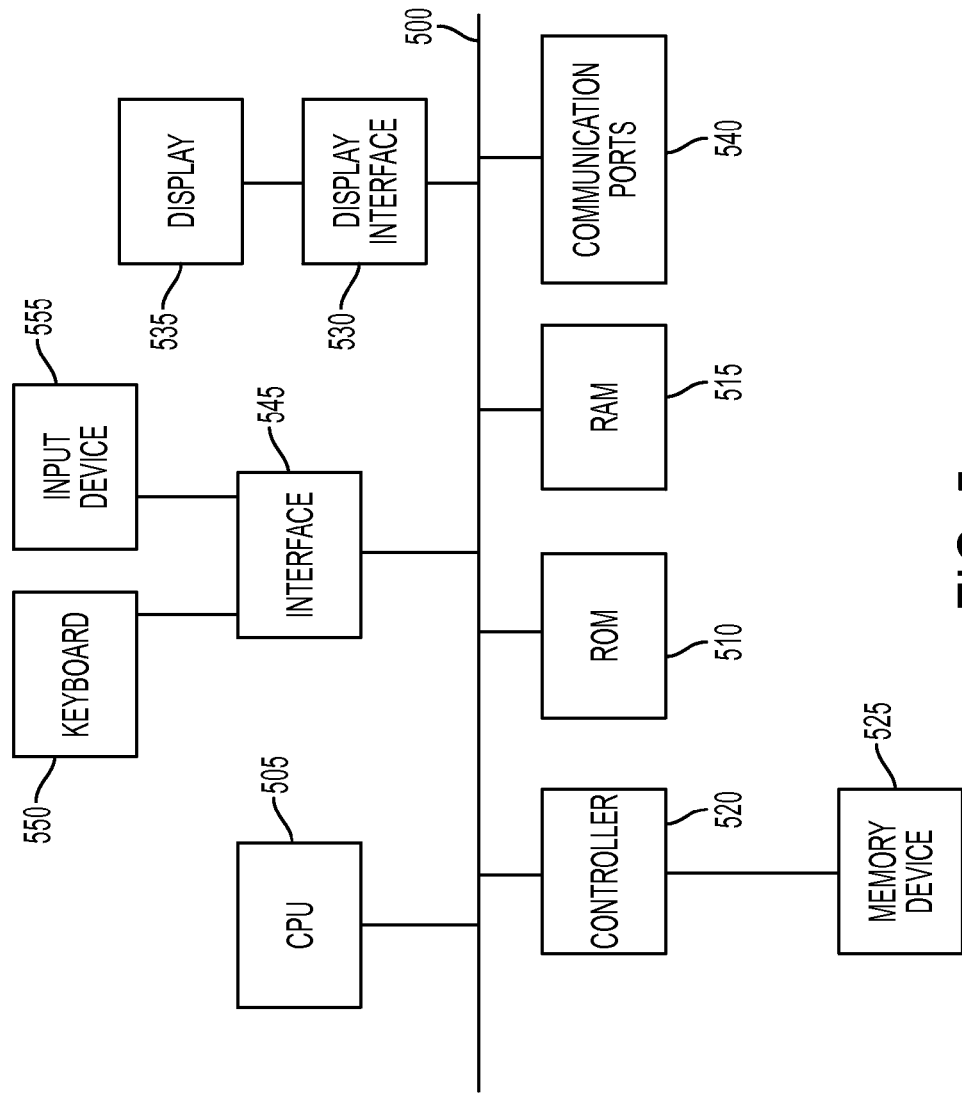
FIG. 5 illustrates a block diagram of example hardware that may be used to contain or implement program instructions according to an embodiment.

FIG. 5 depicts a block diagram of hardware that may be used to contain or implement program instructions. A bus 500 serves as the main information highway interconnecting the other illustrated components of the hardware. CPU 505 is the central processing unit of the system, performing calculations and logic operations required to execute a program. CPU 505, alone or in conjunction with one or more of the other elements disclosed in FIG. 5, is an example of an electronic device, computing device or processor as such terms are used within this disclosure. Read only memory (ROM) 510 and random access memory (RAM) 515 constitute examples of non-transitory computer-readable storage media.

A controller 520 interfaces with one or more optional non-transitory computer-readable storage media 525 to the system bus 500. These storage media 525 may include, for example, an external or internal DVD drive, a CD ROM drive, a hard drive, flash memory, a USB drive or the like. As indicated previously, these various drives and controllers are optional devices.

Program instructions, software, or interactive modules for providing the interface and performing any querying or analysis associated with one or more data sets may be stored in the ROM 510 and/or the RAM 515. Optionally, the program instructions may be stored on a tangible, non-transitory computer-readable medium such as a compact disk, a digital disk, flash memory, a memory card, a USB drive, an optical disc storage medium and/or other recording medium.

An optional display interface 530 may permit information from the bus 500 to be displayed on the display 535 in audio, visual, graphic or alphanumeric format. Communication with external devices, such as a printing device, may occur using various communication ports 540. A communication port 540 may be attached to a communications network, such as the Internet or an intranet.

The hardware may also include an interface 545 which allows for receipt of data from input devices such as a keyboard 550 or other input device 555 such as a mouse, a joystick, a touch screen, a remote control, a pointing device, a video input device and/or an audio input device.

It will be appreciated that the various above-disclosed and other features and functions, or alternatives thereof, may be desirably combined into many other different systems or applications or combinations of systems and applications. Various presently unforeseen or unanticipated alternatives, modifications, variations or improvements therein may be subsequently made by those skilled in the art which are also intended to be encompassed by the following claims.

The invention claimed is:

1. A method of producing a variable data design file for use in production of a personalized copy of a three-dimensional (3D) object, the method comprising:

by a processing device:

receiving a plurality of fixed structural parameters for a reference 3D object;

receiving information for creation of a plurality of variable structural parameters corresponding to a plurality of variable data regions on the reference 3D object, wherein the information comprises mapping information for associating each of the plurality of variable data regions with one or more data sources;

using the plurality of fixed structural parameters to develop an instruction set that is configured to, when executed by a processor of a 3D printing device, cause the 3D printing device to form a 3D object that exhibits the plurality of fixed structural parameters;

including, in the instruction set, instructions for creating the plurality of variable structural parameters based on the received information, that when executed by the processor of the 3D printing device, will cause the 3D printing device to render at least one of the plurality of variable data regions in the 3D object, wherein the at least one variable data region differs from a corresponding region of the reference 3D object;

saving the instruction set to a variable data design file; and causing a 3D printing device to use the variable data design file to print a plurality of personalized copies of the reference 3D object, wherein each personalized copy of the reference 3D object is a 3D object that exhibits the plurality of fixed structural parameters and comprises at least one variable data region that differs from a corresponding region of the reference 3D object.

2. The method of claim 1, wherein the information for creation of the plurality of variable structural parameters further comprises at least one of the following:

location information of each of the plurality of variable data regions, identification information for each of the plurality of variable data regions, or metadata information for each of the plurality of variable data regions.

3. The method of claim 1, wherein the mapping information comprises at least one of the following:

identification of at least one database for retrieving variable data for creation of the plurality of variable structural parameters;

a rule set for linking variable data included in the at least one database to the plurality of variable data regions; or a rule set for automatically identifying the at least one database or the rule set for linking the variable data to the plurality of variable data regions.

4. The method of claim 1, further comprising, by the processing device:

receiving variable data for creation of the plurality of variable structural parameters from a data source;

linking the variable data to the at least one variable data region;

creating the plurality of variable structural parameters using the information for creation of a plurality of variable structural parameters and the variable data;

creating a variable data job specification comprising the plurality of variable structural parameters corresponding to the at least one variable data region; and saving the variable data job specification.

5. The method of claim 1, further comprising, by the processing device, creating a 3D print job for creating the plurality of personalized copies of the reference 3D object by:

retrieving a plurality of records corresponding to variable job specifications of each of the plurality of personalized copies; and merging each of the plurality of records with the variable data design file.

6. The method of claim 5, wherein causing the 3D printing device to use the variable data design file to print the plurality of personalized copies of the reference 3D object comprises:

by the processor of the 3D printing device, executing the 3D print job and, based on the 3D print job, forming the plurality of personalized copies of the reference 3D object.

7. The method of claim 6, further comprising, by the processing device:

rendering digital images of each of the plurality of personalized copies of the reference 3D object using the 3D print job;

presenting the digital images to a user, via a user interface; and receiving user approval for forming the plurality of personalized copies of the reference 3D object using the 3D printer.

8. The method of claim 5, further comprising, by the processing device:

receiving print device capabilities corresponding to the 3D printing device; and formatting the variable data design file to be compatible with the 3D print device based on the received print device capabilities.

9. The method of claim 8, further comprising, by the processing device:

formatting each of the variable job specifications to be compatible with the 3D print device to create a plurality of formatted variable job specifications; and merging each of the plurality of formatted variable job specifications with the formatted variable data design file to create the 3D print job.

10. The method of claim 1, wherein receiving information for creation of a plurality of variable structural parameters corresponding to the plurality of variable data regions on the reference 3D object comprises:

by the processing device, accessing a data source comprising information relating to a plurality of customers; and by the processing device, accessing a rule set to automatically determine the information for the creation of the plurality of variable structural parameters.

11. A method of producing a plurality of personalized copies of a reference three-dimensional (3D) object, the method comprising:

receiving a selection of a reference three-dimensional object;

by a processing device, accessing a reference data file comprising a plurality of fixed structural parameters for the reference 3D object;

by the processing device, accessing a variable data file comprising instructions for creating a plurality of variable structural parameters for producing a plurality of variable data regions on the reference 3D object;

by the processing device, executing, for each of the plurality of personalized copies of the reference three-dimensional object, a plurality of instructions to create a variable data job specification, wherein the variable data job specification comprises a set of variable structural parameters corresponding to a set of variable data regions in that personalized copy;

by the processing device, creating a 3D print file by merging the variable data job specification for each of the plurality of personalized copies of the reference 3D object with at least one of the following:

the reference data file, or the variable data file; and by the processing device, causing a 3D printing device to form the plurality of personalized copies of the reference 3D object using the 3D print file, wherein each personalized copy of the reference 3D object is a 3D object that exhibits the plurality of fixed structural parameters and comprises at least one variable data region that differs from a corresponding region of the reference 3D object.

12. The method of claim 11, wherein executing the plurality of instructions to create the variable data job specification comprises:
- receiving mapping information for each of the plurality of variable data regions;
- receiving variable data for creation of the set of variable structural parameters from a data source;
- linking the variable data to the set of variable data regions in the personalized copy; and
- creating the set of variable structural parameters using the variable data file.

13. The method of claim 11, further comprising, by the processing device:
- receiving print device capabilities corresponding to the 3D printing device; and
- using the received print device capabilities to format the variable data file to be compatible with the 3D print device.

14. The method of claim 13, further comprising, by the processing device:
- using the received print device capabilities to format the variable job specifications for each of the plurality of personalized copies of the reference 3D object to be compatible with the 3D print device to create a plurality of formatted variable job specifications; and
- merging each of the plurality of formatted variable job specifications with the formatted variable data design file to create the 3D print file.

15. The method of claim 11, further comprising, by the processing device:
- rendering digital images of each of the plurality of personalized copies of the reference 3D object using the 3D print file;
- presenting the digital images to a user, via a user interface; and
- receiving user approval for forming the plurality of personalized copies of the reference 3D object using the 3D printing device.

16. A system for producing a variable data design file for use in production of a personalized copy of a three-dimensional (3D) object, the system comprising:
- a processing device; and
- a computer-readable memory containing programming instructions that, when executed by the processing device, cause the processing device to:
  - receive a plurality of fixed structural parameters for a reference 3D object;
  - receive information for creation of a plurality of variable structural parameters corresponding to a plurality of variable data regions on the reference 3D object, wherein the information comprises mapping information for associating each of the plurality of variable data regions with one or more data sources;
  - use the plurality of fixed structural parameters to develop an instruction set that is configured to, when executed by a processor of a 3D printing device, cause the 3D printing device to form a 3D object that exhibits the plurality of fixed structural parameters;
  - include, in the instruction set, instructions for creating the plurality of variable structural parameters based on the received information, that when executed by the processor of the 3D printing device, will cause the 3D printing device to render at least one of the plurality of variable data regions in the 3D object, wherein the at least one variable data region differs from a corresponding region of the reference 3D object;
  - save the instruction set to a variable data design file; and
  - cause a 3D printing device to use the variable data design file to print a plurality of personalized copies of the reference 3D object, wherein each personalized copy of the reference 3D object is a 3D object that exhibits the plurality of fixed structural parameters and comprises at least one variable data region that differs from a corresponding region of the reference 3D object.

17. The system of claim 16, wherein the information for creation of the plurality of variable structural parameters further comprises at least one of the following:
- location information of each of the plurality of variable data regions,
- identification information for each of the plurality of variable data regions, or
- metadata information for each of the plurality of variable data regions.

18. The system of claim 16, wherein the mapping information comprises at least one of the following:
- identification of at least one database for retrieving variable data for creation of the plurality of variable structural parameters;
- a rule set for linking the variable data to the plurality of variable data regions; or
- a rule set for automatically identifying the at least one database or the rule set for linking the variable data to the plurality of variable data regions.

19. The system of claim 16, further comprising programming instructions that, when executed by the processing device, cause the processing device to:
- receive variable data for creation of the plurality of variable structural parameters from a data source;
- link the variable data to the at least one variable data region;
- create the plurality of variable structural parameters using the information for creation of a plurality of variable structural parameters and the variable data;
- create a variable data job specification comprising the plurality of variable structural parameters corresponding to the at least one variable data region; and
- save the variable data job specification.

20. The system of claim 16, further comprising programming instructions that, when executed by the processing device, cause the processing device to create a 3D print job for creating the plurality of personalized copies of the reference 3D object by:
- retrieving a plurality of records corresponding to variable job specifications of each of the plurality of personalized copies; and
- merging each of the plurality of records with the variable data design file.

21. The system of claim 20, wherein the programming instructions that cause the 3D printing device to use the variable data design file to print the plurality of personalized copies of the reference 3D object further comprise programming instructions that, when executed cause the processor of the 3D printing device to:
- execute the 3D print job; and
- form the plurality of personalized copies of the reference 3D object based on the 3D print job.

22. The system of claim 21, further comprising, comprising programming instructions that, when executed cause the processing device to:

render digital images of each of the plurality of personalized copies of the reference 3D object using the 3D print job;
present the digital images to a user, via a user interface; and
receive user approval for forming the plurality of personalized copies of the reference 3D object using the 3D printer.

23. The system of claim 20, further comprising, comprising programming instructions that, when executed cause the processing device to:
receive print device capabilities corresponding to the 3D printing device; and
format the variable data design file to be compatible with the 3D print device based on the received print device capabilities.

24. The system of claim 23, further comprising, comprising programming instructions that, when executed cause the processing device to:
format each of the variable job specifications to be compatible with the 3D print device to create a plurality of formatted variable job specifications; and
merge each of the plurality of formatted variable job specifications with the formatted variable data design file to create the 3D print job.

25. The system of claim 16, wherein programming instructions that, when executed by the processing device, cause the processing device to receive information for creation of a plurality of variable structural parameters corresponding to the plurality of variable data regions on the reference 3D object comprise programming instructions to:
access a data source comprising information relating to a plurality of customers; and
access a rule set to automatically determine the information for the creation of the plurality of variable structural parameters.

26. A system for producing a plurality of personalized copies of a reference three-dimensional (3D) object, the system comprising:
a processing device; and
a computer-readable memory containing programming instructions that, when executed by the processing device, cause the processing device to:
receive a selection of a reference three-dimensional object;
access a reference data file comprising a plurality of fixed structural parameters for the reference 3D object;
access a variable data file comprising instructions for creating a plurality of variable structural parameters for producing a plurality of variable data regions on the reference 3D object;
execute, for each of the plurality of personalized copies of the reference three-dimensional object, a plurality of instructions to create a variable data job specification, wherein the variable data job specification comprises a set of variable structural parameters corresponding to a set of variable data regions in that personalized copy;
create a 3D print file by merging the variable data job specification for each of the plurality of personalized copies of the reference 3D object with at least one of the following:
the reference data file, or
the variable data file; and
cause a 3D printing device to form the plurality of personalized copies of the reference 3D object using the 3D print file, wherein each personalized copy of the reference 3D object is a 3D object that exhibits the plurality of fixed structural parameters and comprises at least one variable data region that differs from a corresponding region of the reference 3D object.

27. The system of claim 26, wherein programming instructions that, when executed by the processing device, cause the processing device to execute the plurality of instructions to create the variable data job specification comprise instructions to:
receive mapping information for each of the plurality of variable data regions;
receive variable data for creation of the set of variable structural parameters from a data source;
link the variable data to the set of variable data regions in the personalized copy; and
create the set of variable structural parameters using the variable data file.

28. The system of claim 26, further comprising programming instructions that, when executed by the processing device, cause the processing device to:
receive print device capabilities corresponding to the 3D printing device; and
use the received print device capabilities to format the variable data file to be compatible with the 3D print device.

29. The system of claim 28, further comprising, programming instructions that, when executed by the processing device, cause the processing device to:
use the received print device capabilities to format the variable job specifications for each of the plurality of personalized copies of the reference 3D object to be compatible with the 3D print device to create a plurality of formatted variable job specifications; and
merge each of the plurality of formatted variable job specifications with the formatted variable data design file to create the 3D print file.

30. The system of claim 26, further comprising, programming instructions that, when executed by the processing device, cause the processing device to:
render digital images of each of the plurality of personalized copies of the reference 3D object using the 3D print file;
present the digital images to a user, via a user interface; and
receive user approval for forming the plurality of personalized copies of the reference 3D object using the 3D print device.

31. A system for producing a plurality of personalized copies of a reference three-dimensional (3D) object, the system comprising:
a 3D printing device; and
a computer-readable memory comprising a 3D print file comprising instructions that, when executed by a processor, will cause the 3D printing device to form a plurality of personalized copies of a reference three-dimensional (3D) object by:
depositing, for each of the plurality of personalized copies, a plurality of layers of build material, and
including, for each of the plurality of personalized copies, in one or more of the layers, at least one variable data region that differs from a corresponding region of the reference 3D object,
wherein the 3D print file comprises a plurality of variable data job specifications for printing the plurality of personalized copies of the reference 3D object, wherein each of the plurality of variable data job specifications comprises a set of variable structural parameters corresponding to a set of variable data regions each of which differs from a corresponding region of the reference 3D object and a set of fixed structural parameters corresponding to a set of fixed structural regions each of which is identical to a corresponding region of the reference 3D object.

\* \* \* \* \*